United States Patent
Yoshihara (10) Patent No.: US 8,301,071 B2
(45) Date of Patent: Oct. 30, 2012

(54) IMAGE FORMING APPARATUS AND METHOD FOR CONTROLLING THE LOG-OFF OF USER

(75) Inventor: Toshio Yoshihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

(21) Appl. No.: 12/842,851

(22) Filed: Jul. 23, 2010

(65) Prior Publication Data

US 2011/0020026 A1    Jan. 27, 2011

(30) Foreign Application Priority Data

Jul. 27, 2009 (JP) ................................. 2009-174514

(51) Int. Cl.
*G03G 21/00* (2006.01)
*G03G 15/00* (2006.01)

(52) U.S. Cl. ......................................... 399/366; 399/80
(58) Field of Classification Search ............ 399/80, 399/81, 82, 366; 726/28; 380/51, 55
See application file for complete search history.

(56) References Cited

U.S. PATENT DOCUMENTS

| | | | |
|---|---|---|---|
| 7,653,947 B2 * | 1/2010 | Hatano | 726/32 |
| 8,060,928 B2 * | 11/2011 | Muto | 726/16 |
| 2004/0153675 A1 * | 8/2004 | Dorn et al. | 713/202 |
| 2005/0091338 A1 * | 4/2005 | de la Huerga | 709/217 |
| 2005/0193221 A1 * | 9/2005 | Yoneyama | 713/201 |
| 2009/0213423 A1 * | 8/2009 | Kusakabe | 358/1.15 |

FOREIGN PATENT DOCUMENTS

| | | | |
|---|---|---|---|
| JP | 2005141549 A | * | 6/2005 |
| JP | 2008-265081 | | 11/2008 |

* cited by examiner

*Primary Examiner* — Robert Beatty
(74) *Attorney, Agent, or Firm* — Canon USA Inc. IP Division (57) ABSTRACT

An image forming apparatus includes an acquisition unit for acquiring information for identifying a user, a log-in unit for allowing the user to log in the image forming apparatus when the acquisition unit acquires the information for identifying the user, a log-off unit for causing the logged-in user to log off from the image forming apparatus after a first predetermined time period elapses, a determination unit for determining whether a secure printing job to be performed based on the acquired information for identifying the user is present in the image forming apparatus, and a control unit for controlling the log-off unit to cause the user to log off from the image forming apparatus within a second predetermined time period which is shorter than the first predetermined period time, when the determination unit determines that the secure printing job is present in the image forming apparatus.

11 Claims, 10 Drawing Sheets

AUTHENTICATION MANAGEMENT INFORMATION

| ID INFORMATION | USER NAME | PC IN USE | ... | ... |
|---|---|---|---|---|
| 0000 | AAA | PC-AAA | ... | ... |
| 0001 | BBB | PC-BBB | ... | ... |
| 0002 | CCC | PC-CCC | ... | ... |
| 0003 | DDD | PC-DDD | ... | ... |

IMAGE FORMING APPARATUS AND METHOD FOR CONTROLLING THE LOG-OFF OF USER

BACKGROUND OF THE INVENTION

1. Field of the Invention

The present invention relates to an image forming apparatus including a log-off function, a method for controlling the same, and a storage medium.

2. Description of the Related Art

In recent years, it has been common that a plurality of devices are connected to a network for exchanging data between the devices such as image forming apparatuses or for transmitting job data from a predetermined device to another device in which the job is executed. More specifically, in many cases, data is transmitted from a predetermined device to an image forming apparatus which has a printing function, so that the data is printed by the image forming apparatus. Accordingly, a number of inventions associated with an individual authentication function have been discussed from the viewpoint of safe handling of print data.

Secure printing is one of the techniques that involve the individual authentication function. Secure printing is a technique which performs printing when a user who sends a job from a predetermined device to another device is identified as a user who is personally authenticated, and it enables safer handling of print data.

As a technique using secure printing, Japanese Patent Application Laid-Open No. 2008-265081 discusses an image forming apparatus including an individual authentication function in which, when secure printing is performed after individual authentication, log-off processing is performed after a predetermined time period has passed without any operation to the apparatus, regardless of a job type and whether any job to be executed by the apparatus is present therein or not.

SUMMARY OF THE INVENTION

According to an aspect of the present invention, an image forming apparatus includes an acquisition unit configured to acquire information for identifying a user, a log-in unit configured to allow the user to log in the image forming apparatus when the acquisition unit acquires the information for identifying the user, a log-off unit configured to cause the user who has been logged in by the log-in unit to log off from the image forming apparatus after a first predetermined time period elapses, a determination unit configured to determine whether a secure printing job to be performed based on the information for identifying the user acquired by the acquisition unit is present in the image forming apparatus, and a control unit configured to control the log-off unit to cause the user to log off from the image forming apparatus within a second predetermined time period which is shorter than the first predetermined period time, when the determination unit determines that the secure printing job is present in the image forming apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
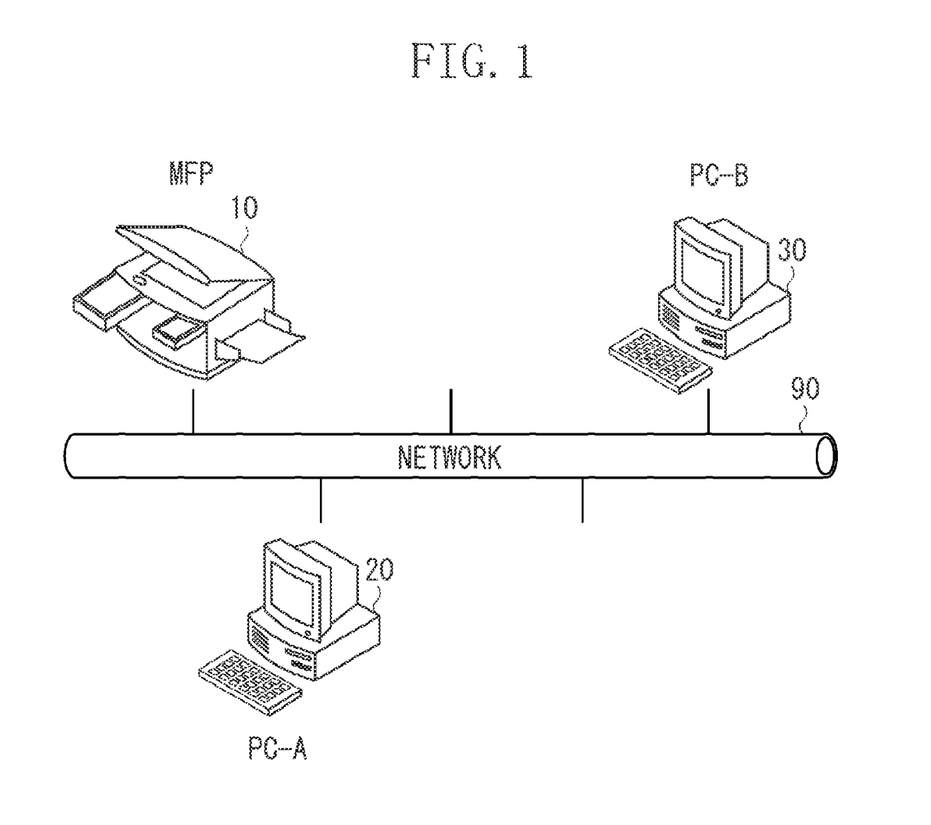
FIG. 1 illustrates a system configuration including an image forming apparatus.

A system of a first exemplary embodiment illustrated in FIG. 1 includes an image forming apparatus and host computers that are connected to one another via a network. More specifically, an image forming apparatus 10 is connected to host computers 20 and 30 via a local area network (LAN) 90.

The image forming apparatus 10 includes functions to input and output image data, namely to input data on a sheet document and output and print the data onto a paper sheet. The input image data can be printed onto a sheet, stored as digital data, and transmitted to other devices via the LAN 90.

When the host computer 20 or 30 controls the image forming apparatus 10 to perform printing of such data via the LAN 90, the host computer 20 or 30 transmits the data in page description language (PDL) to the image forming apparatus 10 in which the PDL data is printed out.

Figure 2:
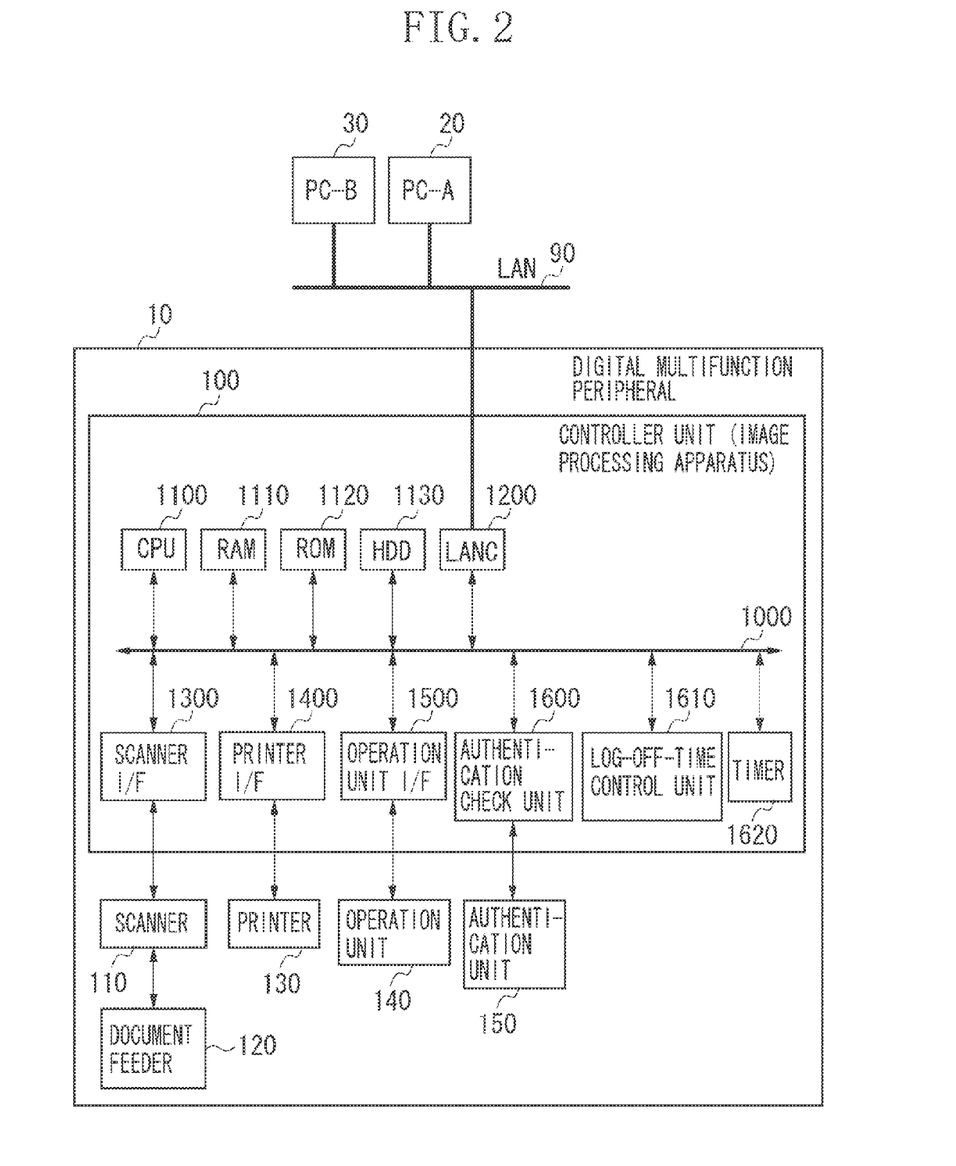
FIG. 2 illustrates a configuration of an image forming apparatus and a configuration of a controller unit.

The image forming apparatus 10 is generally a copying machine which includes a controller unit 100, a scanner 110, a document feeder 120, a printer 130, an operation unit 140, and an authentication unit 150, as illustrated in FIG. 2. More specifically, the controller unit 100 includes a controller bus 1000, a central processing unit (CPU) 1100, a random access memory (RAM) 1110, a read-only memory (ROM) 1120, a hard disk drive (HDD) 1130, a local area network controller (LANC) 1200, a scanner interface (I/F) 1300, a printer I/F 1400, an operation unit I/F 1500, an authentication check unit 1600, a log-off-time control unit 1610, and a timer 1620.

The controller bus 1000 is an internal bus that enables units included in the controller unit 100 to transmit print data and control signals therebetween.

The CPU 1100 is a processor for controlling the image forming apparatus 10. For example, the CPU 1100 controls job processing for printing PDL data, and controls each unit in the image forming apparatus 10. The CPU 1100 is also a unit for instructing log-in and log-off controls of the image forming apparatus 10.

The RAM 1110 is a unit which temporarily stores various pieces of data such as image data to be used by the CPU 1100 in execution of a software program. The RAM 1110 is also used in execution of programs stored in the ROM 1120 and the HDD 1130, which are described below. In other words, the RAM 1110 is a work memory of the CPU 1100.

The ROM 1120 stores a boot program for the image forming apparatus 10, and programs for controlling respective units in the controller unit 100 are loaded onto the RAM 1110 and executed in response to acquisition of authentication information which will be described below. Further, the ROM 1120 stores an automatic log-off control program that causes the image forming apparatus 10 to automatically shift from a log-in state to a log-off state after a predetermined time period elapses.

The HDD 1130 is a unit which stores PDL jobs transmitted from the host computer 20 or 30 and image data received from the scanner 110, which is described below. Further, the HDD 1130 stores programs for correcting image processing and character processing of data to be output from the image forming apparatus 10, and programs for controlling copying, scanning, and printing functions of the image forming apparatus 10.

The LANC 1200 is a unit which receives image data transmitted from the host computer 20 or 30, and also transmits image data read by the scanner 110 to the host computer 20 or 30.

The scanner I/F 1300 is connected to the scanner 110 to transmit an image read by the scanner 110 to the HDD 1130. The document feeder 120 can accommodate a plurality of document sheets and continuously feed the document sheets. The printer I/F 1400 is connected to the printer 130 to transmit job data, which is converted into a format printable by the printer 130, to the printer 130. The operation unit I/F 1500 transmits an instruction from the operation unit 140 in a form of an electrical signal.

The authentication check unit 1600 performs individual authentication based on authentication information and authentication data transmitted from the authentication unit 150 for user identification. The authentication data used for individual authentication may be stored in the HDD 1130 or a server (not illustrated) connected to the LAN 90. The individual authentication unit of the present exemplary embodiment performs individual authentication using an identification (ID) card, but the authentication may be performed in any method such as face authentication, fingerprint authentication, and vein authentication. Only when authentication information matches authentication data, log-in control can be performed. Then, when the authentication check unit 1600 confirms the individual authentication, a user can log in the image forming apparatus 10.

The log-off-time control unit 1610 controls the time to automatically shift from a log-in state to a log-off state. The log-off-time control unit 1610 is provided with a log off timer as a timer module, so that the CPU 1100 performs automatic log-off control according to setting of the log off timer. The log off timer may be arbitrarily set to any value.

The timer 1620 measures a period of time, and the CPU 1100 controls the timings to start and end the measuring. The timer 1620 measures elapsed time after a job ends.

Figure 3:
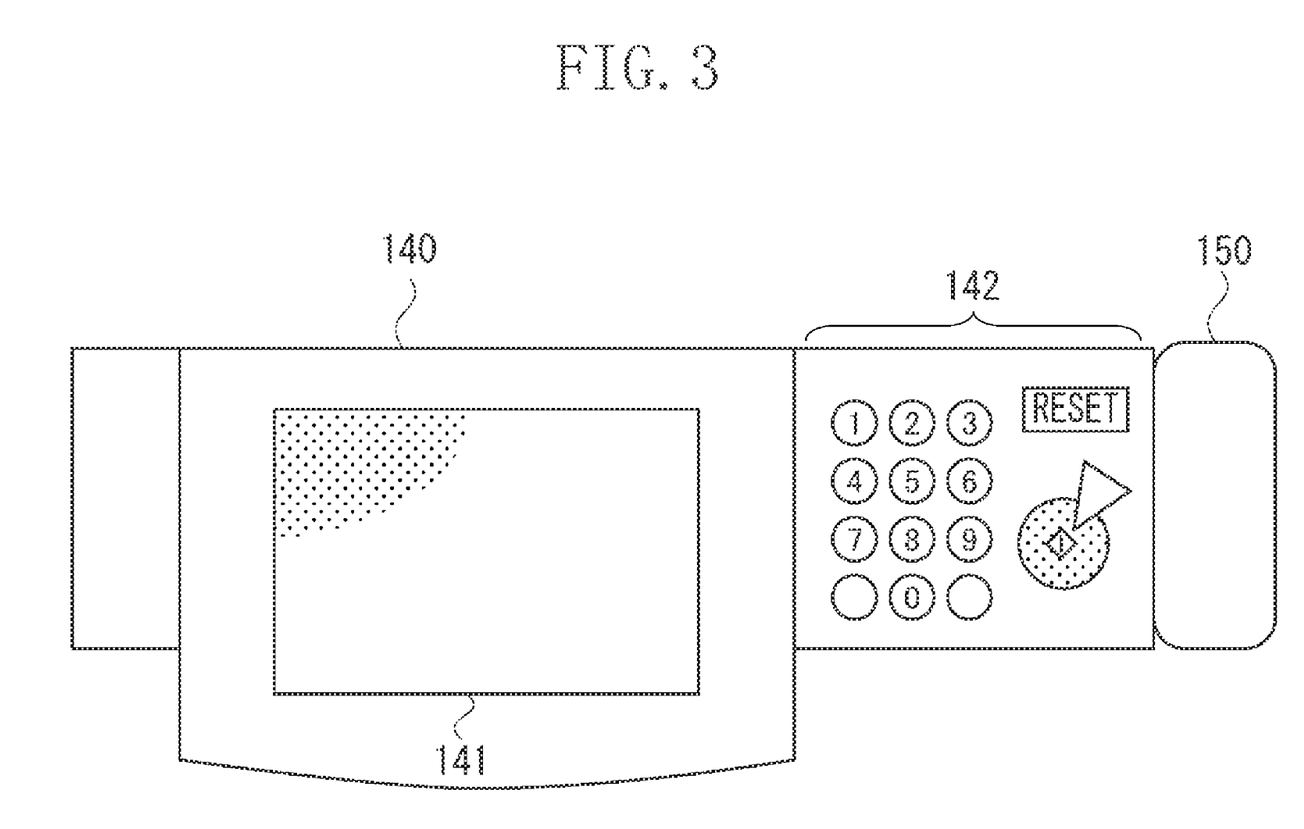
FIG. 3 illustrates an example configuration of an operation unit.

FIG. 3 illustrates an example of the operation unit 140 and the authentication unit 150. As illustrated in FIG. 3, the operation unit 140 includes a touch panel 141 and operation buttons 142.

The touch panel 141 provides displays that guide various operations, and also serves as an input device that accepts inputs from a user who touches the panel. The operation buttons 142 are used to input numeric values via ten-keys and operations such as a start of copying. Every operation instruction input via the operation unit 140 is converted into electrical signals, transmitted via the operation unit I/F 1500 to the CPU 1100, and recognized and processed using a program by the CPU 1100 so as to perform setting for overall apparatus 10. When an input operation instructs an execution of a function, a corresponding process for copying or scanning for example is performed.

The authentication unit 150 performs authentication by an ID card and receives authentication data when the ID card is put closer to a central part of the authentication unit 150. The authentication unit 150 transmits the received authentication data to the authentication check unit 1600 in which authentication processing is performed.

Figure 4:
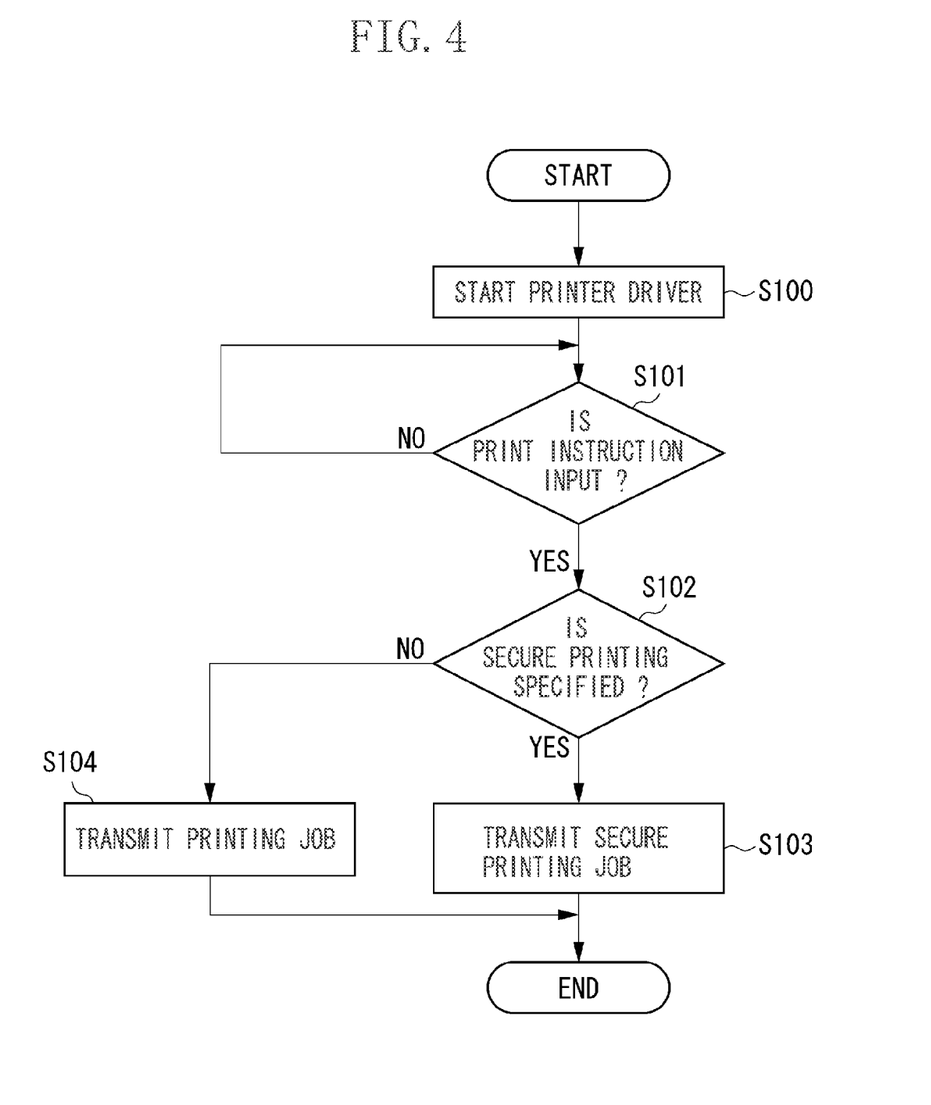
FIG. 4 is a flowchart illustrating job transmission control processing executed by a host computer.
Figure 6:
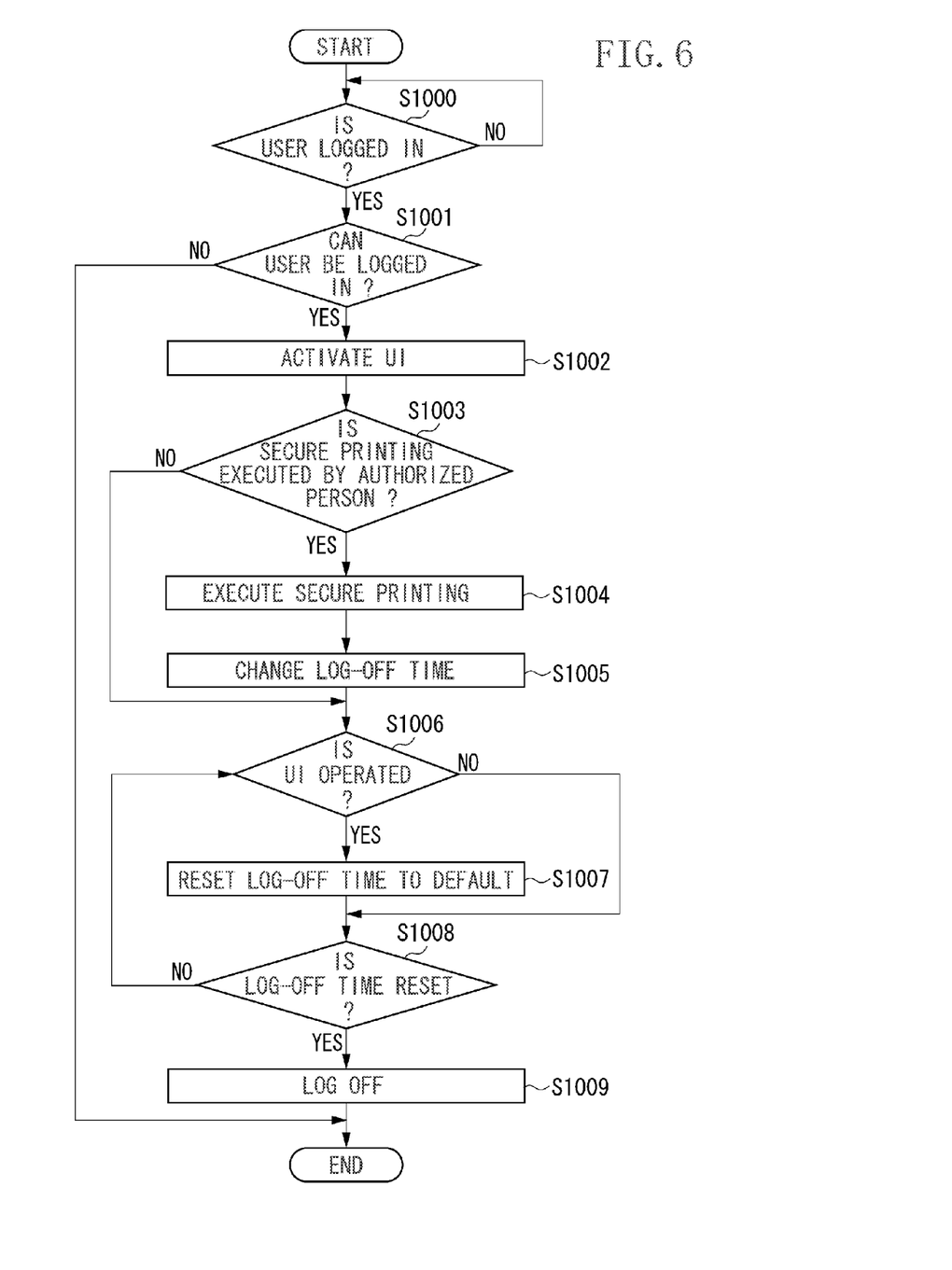
FIG. 6 is a flowchart illustrating log-off processing for a secure printing job.

Log-off processing adapted to a job that requires authentication information will be described in detail below with reference to FIGS. 4 and 6. FIG. 4 is a flowchart illustrating transmission control processing of a printing job from a host computer. FIG. 6 is a flowchart illustrating a method of controlling the image forming apparatus.

Figure 5:
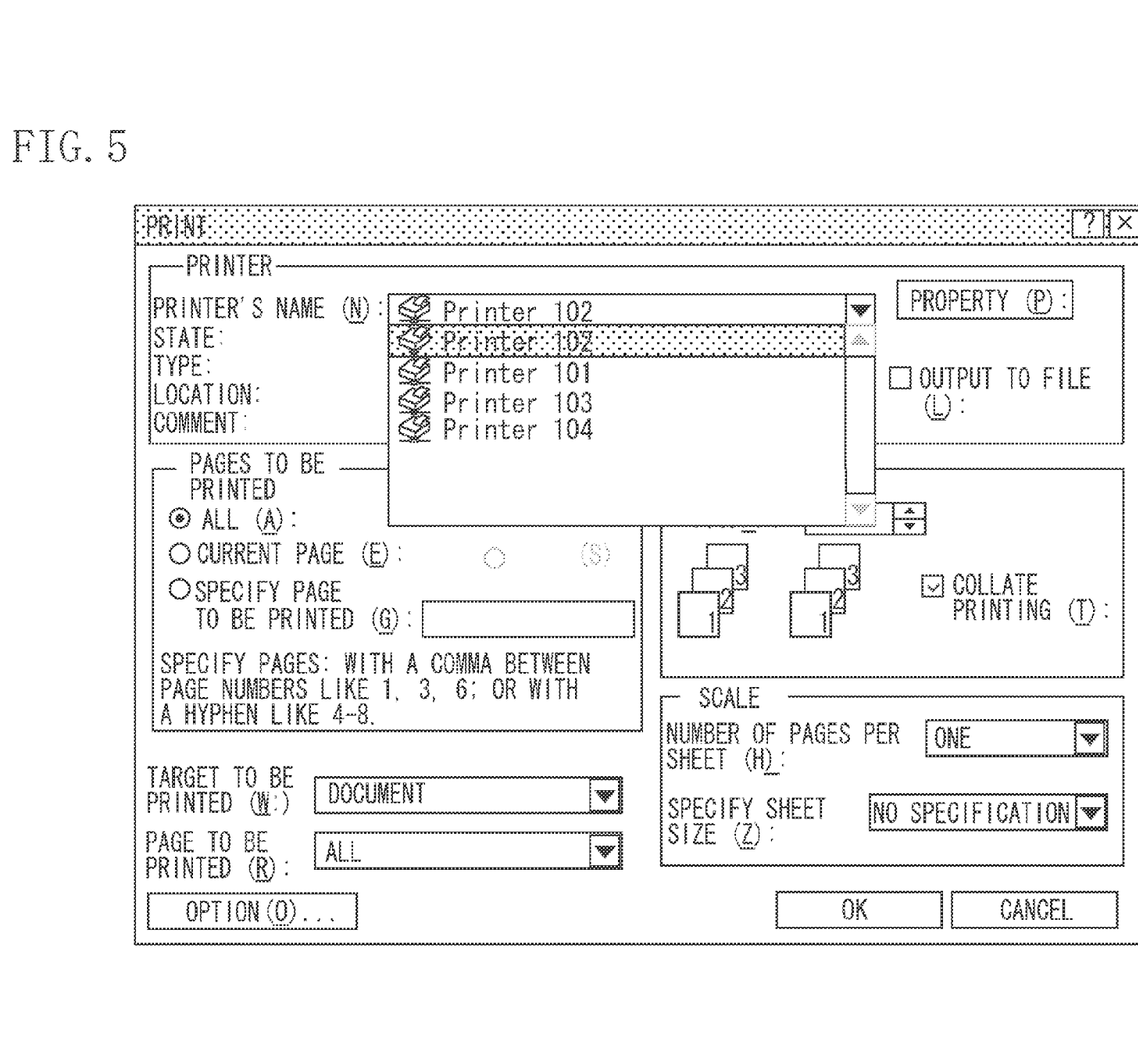
FIG. 5 illustrates an example of a print setting window.

A control program illustrated in FIG. 4 is stored in a ROM (not illustrated) in the host computer 20 or 30, and is activated in response to a print instruction from a user. In step S100, a CPU (not illustrated) in the host computer 20 or 30 controls and displays a window for print setting as illustrated in FIG. 5, in response to activating control program, namely activating a printer driver.

In step S101, the CPU in the host computer 20 or 30 determines whether the print instruction is input. If the print instruction is input (YES in step S101), then in step S102, the CPU confirms whether secure printing is specified.

When the CPU determines that the secure printing is specified in transmitted print data (YES in step S102), in step S103, the CPU converts a secure printing job into a PDL format, and transmits the job together with secure information. When the CPU determines that the secure printing is not specified (NO in step S102), in step S104, the CPU transmits a standard printing job in the PDL format.

The secure information herein means the information added to job data that is used to determine whether a user who transmitted a job from the host computer matches a user who was subjected to individual authentication. When matching of the users is confirmed, job processing specified by the job data can be performed. More specifically, the secure information means predetermined information that is required to perform processing, including information about a device as a job transmission source, such as an IP address and a medium access control (MAC) address of the host computer, a name of the host computer, and information about a user such as employee's ID number and a user's name.

Next, a method for controlling the image forming apparatus 10 will be described. FIG. 6 is a flowchart illustrating processing executed by a program stored in the ROM 1120 in the image forming apparatus 10. In step S1000, the program is activated when a user logs in by performing individual authentication from the authentication unit 150.

In step S1001, the CPU 1100 determines whether the user can log in based on authentication information transmitted to the authentication check unit 1600.

When the CPU 1100 determines that the authentication information matches the authentication data (YES in step S1001), in step S1002, the CPU 1100 controls the image forming apparatus 10 to shift to the log-in state, turns on the power of the operation unit 140, and controls the touch panel 141 to be displayed.

In step S1003, the CPU 1100 determines whether the job data which is instructed for secure printing by the host computer 20 or 30 is stored in the HDD 1130.

The determination is necessary to check if the secure printing is executable or not according to authentication management information based on the authentication information and the secure information used for the log-in. The authentication management information herein refers to a management table which is used to check the matching between the secure information of the job data that is transmitted to the image forming apparatus and the authentication information acquired at the authentication unit when secure printing is executed. The CPU 1100 performs log-in control such that a user who is not registered in the authentication management information cannot log in.

Figure 7:
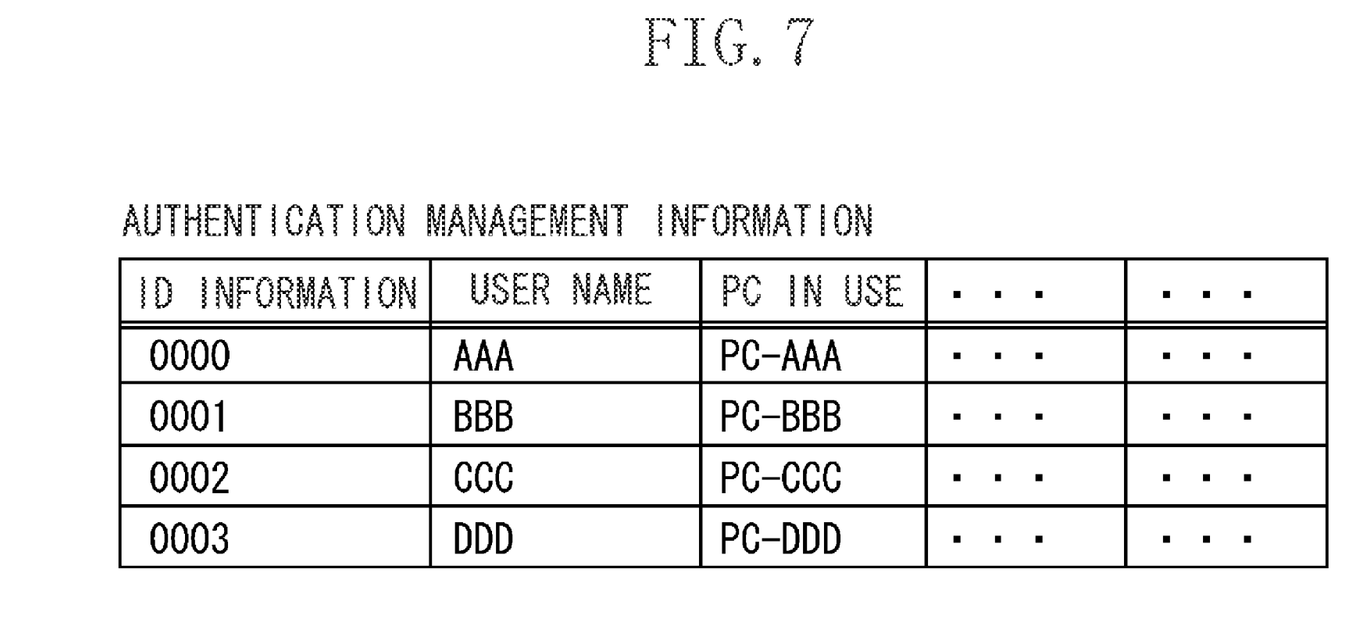
FIG. 7 illustrates an example of authentication management information.

As illustrated in FIG. 7, ID information in the authentication management information defines a user name and a personal computer (PC) that is available to the user. The authentication management information may be stored in the HDD 1130, connected to a network, or stored in a server. In the case where the authentication management information is stored in the server, when the authentication processing is executed in the authentication unit, the CPU 1100 accesses the server via the LAN 90 and then accesses the authentication management information.

Next, an authentication procedure for secure printing that uses the authentication management information according to the first exemplary embodiment will be described. In a case where an ID card is used for authentication, the ID card stores ID information of the authentication management information, and the ID information as a result of authentication at the authentication unit is transmitted from the authentication unit 150 to the authentication check unit 1600.

On the other hand, when the image forming apparatus 10 receives a secure printing job, the CPU 1100 acquires secure information from the job data of the secure printing. The CPU 1100 compares the host PC information which is the secure information and the ID information transmitted from the authentication unit with the ID information in the authentication management information and the information about the available PC, and determines whether the secure printing is executable.

when the secure print is executable (YES in step S1003), in step S1004, the CPU 1100 instructs printing using the secure printing function.

In step S1005, the log-off-time control unit 1610 sets a default value of a log off timer to a value at the time of execution of the secure printing. The default value of the log off timer corresponds to a predetermined time period before starting log-off processing, and the value at the time of execution of the secure printing is shorter than the default value. The log off timer is counted down as time goes, and when the value of the log off timer becomes zero, the log-off processing automatically starts.

In step S1006, the CPU 1100 determines whether the operation unit 140 is operated by the user.

When the CPU 1100 determines that the operation unit 140 is operated (YES in step S1006), then in step S1007, the value of the log off timer in the log-off-time control unit 1610 is reset to the default value. Examples of the operation instruction via the operation unit 140 include those that involve copying function and sending function.

Accordingly, the timer is reset to the default value when the user operates the image forming apparatus 10, so that the time until the image forming apparatus 10 shifts to the log-off processing can be prolonged which facilitates the handling of the image forming apparatus 10 for the user who wants to execute a job other than securing printing.

In step S1008, the CPU 1100 determines whether the value of the log off timer in the log-off-time control unit 1610 is reset to zero.

When the CPU 1100 determines that the value of the log off timer in the log-off-time control unit 1610 is reset to zero (YES in step S1008), in step S1009, the CPU 1100 starts an automatic log-off control program stored in the ROM 1120 to shift the image forming apparatus 10 from the log-in state to a log-off state.

In response to the shift to the log-off state, the CPU 1100 controls the touch panel 141 not to be displayed.

As described above, log-off processing corresponding to a situation can be performed in response to a job that requires the secure information and the confirmation of the job based on the authentication information. Consequently, convenience of the apparatus can be enhanced for the user who wants to execute job processing that does not require the secure information.

In the case where the automatic log-off control is performed as in the first exemplary embodiment, job processing which requires the secure information may be executed in a period of time shorter than that in the case there standard log-off processing is executed, so that job data that requires a high level of security can be handled more safely. In addition, standard log-off processing is performed for job processing that does not require the secure information, so that the convenience of the apparatus is further enhanced.

More specifically, when the default value is set to 100 seconds, the log-off processing is performed after 100 seconds elapsed regardless of a job type and whether any job exists in the apparatus or not, while if the value at the time of execution of the secure printing is set to 10 seconds and if a secure printing job exists, the log-off processing is performed after 10 seconds elapsed.

In the first exemplary embodiment, secure printing is performed in response to individual authentication of a user is performed, however, the secure printing may be performed in response to a reception of an instruction to perform the secure printing from a user after the user's authentication. In that case, the value of the log off timer may be changed after receiving the instruction to perform secure printing.

According to the first exemplary embodiment, the secure information relates to the host computer, however, the secure information may include a user ID and a password for example. In this case, authentication can be performed by inputting the user ID and the password via the operation unit 140 of the image forming apparatus.

The secure information is used to authentication for enabling job execution and may include any content without limitation.

In the first exemplary embodiment, the image forming apparatus determines whether secure printing can be executed according to the authentication management information based on the authentication information and the secure information used for log-in of a user. The following configuration, however, can be also adopted.

For example, if a server apparatus (not illustrated) that collects information and makes determinations is included in the system, the image forming apparatus may receive information for determination via the LAN from the server apparatus, and perform log-off processing based on the information.

Figure 8:
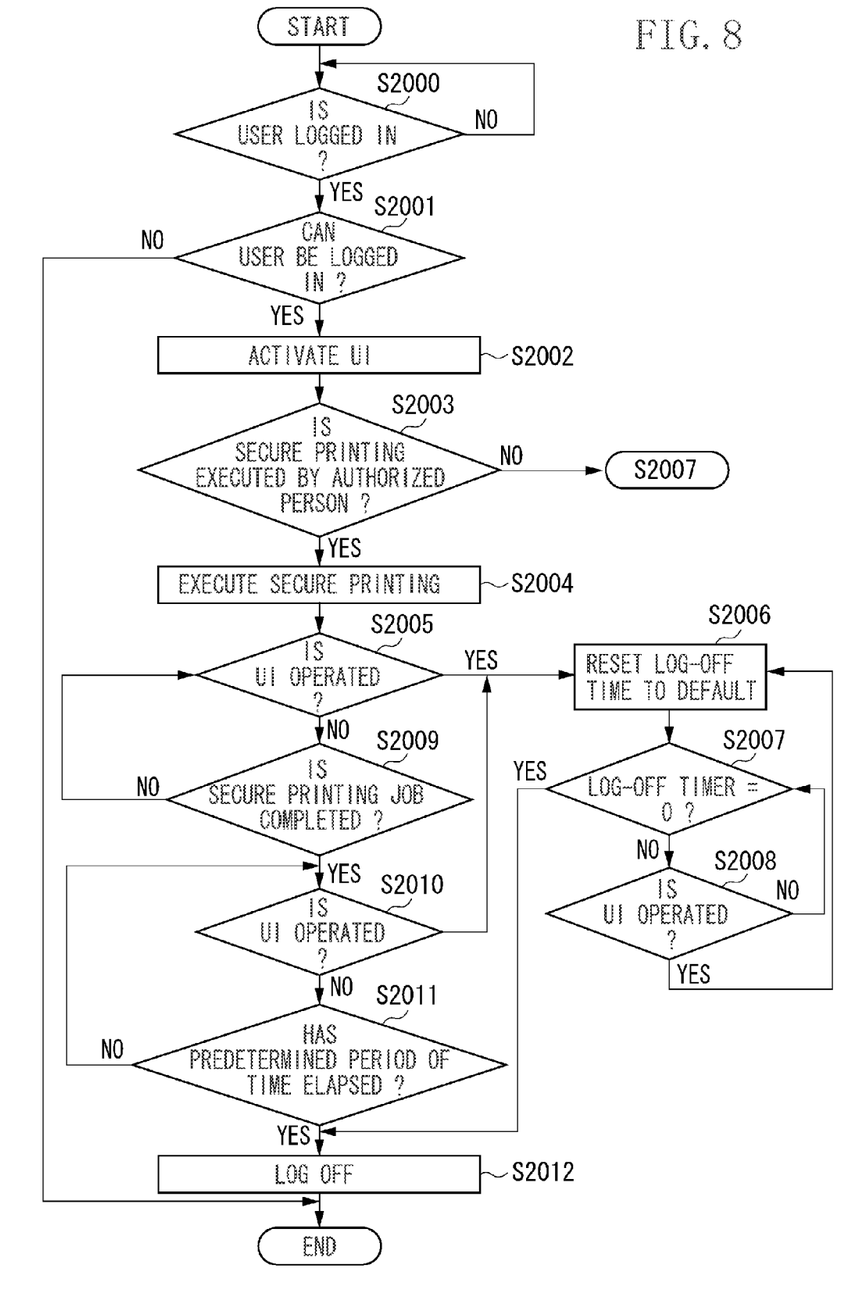
FIG. 8 is a flowchart illustrating log-off processing that is performed when secure-printing job processing ends.

Next, log-off processing that starts when job processing for secure printing is completed will be described below with reference to FIG. 8. The configuration of the image forming apparatus is similar to that illustrated in FIG. 2. FIG. 8 is a flowchart illustrating processing for shifting the apparatus to the log-off state using an elapsed time after the job processing is completed.

First, the host computer 20 or 30 performs control processing similar to that for controlling job transmission in the first exemplary embodiment.

A method for controlling the image forming apparatus 10 will be described. The processing in the flowchart illustrated in FIG. 8 is executed by the program stored in the ROM 1120 in the image forming apparatus 10. In step S2000, the program is activated when a user logs in by performing individual authentication from the authentication unit 150.

In step S2001, the CPU 1100 determines whether the user can log in based on the authentication information transmitted to the authentication check unit 1600. When the CPU 1100 determines that the authentication information matches the authentication data (YES in step S2001), in step S2002, the CPU 1100 controls the image forming apparatus 10 to shift to the log-in state, turns on the power of the operation unit 140, and controls the touch panel 141 to be displayed.

In step S2003, the CPU 1100 determines whether the job data which is instructed for secure printing by the host computer 20 or 30 is stored in the HDD 1130. The determination is necessary to check if the secure printing is executable or not according to authentication management information based on the authentication information and the secure information used for the log-in.

When the secure print is executable (YES in step S2003), in step S2004, the CPU 1100 instructs printing using the secure printing function. The log-off-time control unit 1610 sets a value of the log off timer to a value at the time of execution of the secure printing.

In step S2005, the CPU 1100 determines whether the operation unit 140 is operated by the user. When the CPU 1100 determines that the operation unit 140 is operated (YES in step S2005), in step S2006, the log-off-time control unit 1610 resets the value of the log off timer to the default value.

In step S2007, the CPU 1100 determines whether the value of the log off timer in the log-off-time control unit 1610 becomes zero. If the value of the log off timer is not zero (NO in step S2007), then in step S2008, the CPU 1100 determines whether the operation unit 140 is operated by the user.

If the CPU 1100 determines that the operation unit 140 is not operated (NO in step S2005), then in step S2009, the CPU 1100 determines whether execution of the job added with the secure information is completed. When the CPU 1100 determines that execution of the job is completed (YES in step S2009), in step S2010, the CPU 1100 issues an instruction to control the timer 1620 to start measuring time, so that the measuring is started.

In step S2011, the CPU 1100 acquires the elapsed time measured by the timer 1620, and compares the elapsed time with a predetermined time when the log-off processing is desirably performed after the job is completed.

When the elapsed time at the timer 1620 exceeds the predetermined time when the log-off processing is desirably performed after the job is completed (YES in step S2011), when the default value of the log off timer becomes zero in step S2007, or when the value of the log off timer at the time of execution of the secure printing becomes zero, then in step S2012, the CPU 1100 activates the automatic log-off control program stored in the ROM 1120, and shifts the image forming apparatus 10 from the log-in state to the log-off state. Further, in response to the shift to the log-off state, the CPU 1100 controls the touch panel 141 not to be displayed.

As described above, the log-off time is controlled based on the time when a job is completed. Consequently, the time before shifting to the log-off state is prolonged which enhances convenience of the apparatus for a user who wants to execute another job after a job requiring the secure information is completed.

Figure 9:
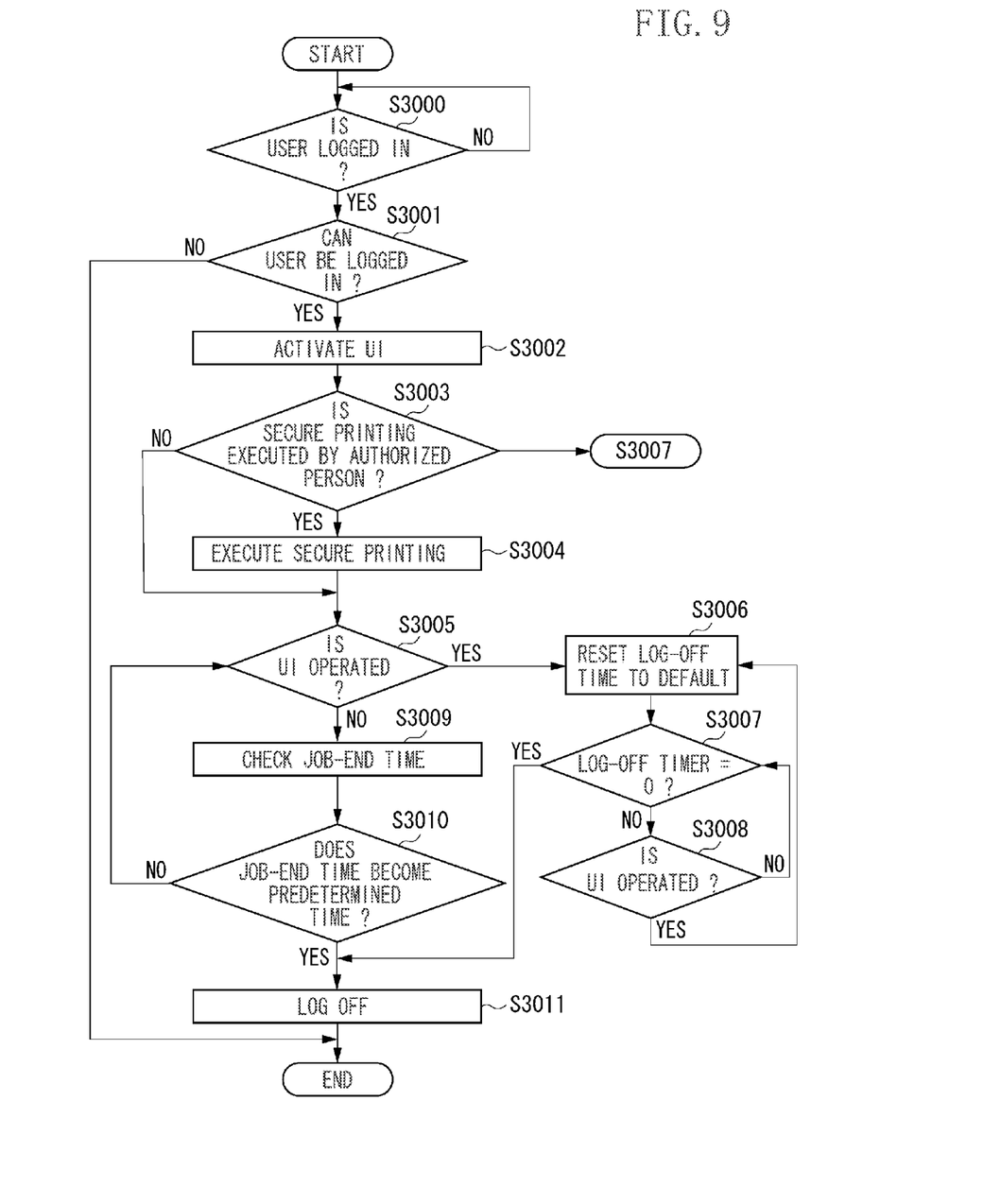
FIG. 9 is a flowchart illustrating log-off processing that is performed using an estimated time when secure-printing job processing ends.

Next, log-off processing that uses estimated time required to complete the job processing for secure printing will be described below with reference to FIG. 9. The configuration of the image forming apparatus is similar to that illustrated in FIG. 2. FIG. 9 is a flowchart illustrating processing for shifting the apparatus to the log-off state using the estimated time.

First, the host computer 20 or 30 performs control processing similar to that for controlling job transmission in the first exemplary embodiment.

A method of controlling the image forming apparatus 10 will be described. The processing in the flowchart illustrated in FIG. 9 is executed by the program stored in the ROM 1120 in the image forming apparatus 10. In step S3000, the program is activated when a user logs in by performing individual authentication from the authentication unit 150.

In step S3001, the CPU 1100 determines whether the user can log in based on authentication information transmitted to the authentication check unit 1600. When the CPU 1100 determines that the authentication information matches the authentication data (YES in step S3001), in step S3002, the CPU 1100 controls the image forming apparatus 10 to shift to the log-in state, turns on the power of the operation unit 140, and controls the touch panel 141 to be displayed.

In step S3003, the CPU 1100 determines whether the job data which is instructed for secure printing by the host computer 20 or 30 is stored in the HDD 1130. The determination is necessary to check if the secure printing is executable or not according to authentication management information based on the authentication information and the secure information used for the log-in.

When the secure print is executable (YES in step S3003), in step S3004, the CPU 1100 instructs printing using the secure printing function. The log-off-time control unit 1610 sets a value of the log off timer to a value at the time of execution of the secure printing.

In step S3005, the CPU 1100 determines whether the operation unit 140 is operated by the user. When the CPU 1100 determines that the operation unit 140 is operated (YES in step S3005), in step S3006, the log-off-time control unit 1610 resets the value of the log off timer to the default value.

In step S3007, the CPU 1100 determines whether the value of the log off timer in the log-off-time control unit 1610 is reset to zero. If the value of the log off timer is not zero (NO in step S3007), then in step S3008, the CPU 1100 determines whether the operation unit 140 is operated by the user. If the CPU 1100 determines that the operation unit 140 is not operated (NO in step S3005), then in step S3009, the CPU 1100 sets time when the log-off processing is desirably performed based on the estimated time when execution of the job added with the secure information is completed.

More specifically, the CPU 1100 compares reference time with the estimated time. When the estimated time is longer than the reference time, the reference time is set as the time when the log-off processing is desirably performed. When the estimated time is shorter than the reference time, the estimated time is set as the time when the log-off processing is desirably performed. The reference time herein means time when the log-off processing is desirably started until predetermined time which can be set by a user or can be set in advance.

In step S3010, the CPU 1100 acquires elapsed time measured by the timer 1620, and compares the elapsed time with the time when the log-off processing is desirably performed.

When the elapsed time at the timer 1620 exceeds the predetermined time when the log-off processing is desirably performed (YES in step S3010), when the default value of the log off timer becomes zero in step S3007, or when the value of the log off timer at the time of execution of the secure printing becomes zero, then in step S3011, the CPU 1100 activates the automatic log-off control program stored in the ROM 1120, and shifts the image forming apparatus 10 from the log-in state to the log-off state.

In response to the shift to the log-off state, the CPU 1100 controls the touch panel 141 not to be displayed.

As described above, according to the present exemplary embodiment, the log-off processing can be performed using the estimated time required for job processing, so that a security level can be enhanced in a case where processing for a job requiring secure information takes time, because a user is logged off from the apparatus after a predetermined time period.

Figure 10:
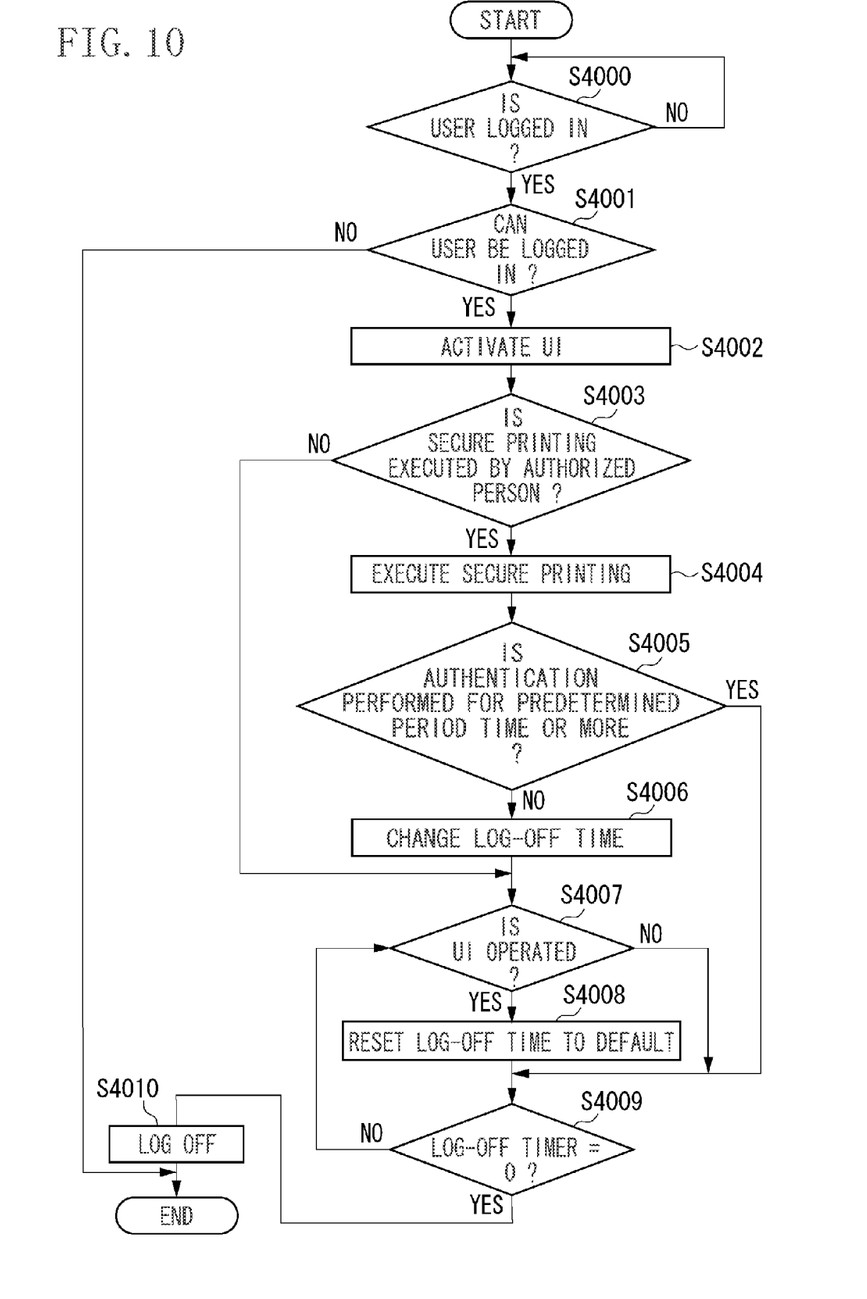
FIG. 10 is a flowchart illustrating log-off processing that is performed using a state of an authentication method.

Next, log-off processing that uses a state of an authentication method will be described below with reference to FIG. 10. The configuration of the image forming apparatus is similar to that illustrated in FIG. 2. FIG. 10 is a flowchart illustrating processing for shifting the apparatus to the log-off state using a state of the authentication method.

The state of the authentication method herein means, for example, a period of time an ID card is being held over an authentication unit for performing the authentication using the ID card. In other words, the state of the authentication method is determined by whether the time that the ID card is held over the authentication unit is longer or shorter than predetermined time.

First, the host computer 20 or 30 performs control processing similar to that for controlling job transmission in the first exemplary embodiment. Next, a method for controlling the image forming apparatus 10 will be described. The processing in the flowchart illustrated in FIG. 10 is executed by the program stored in the ROM 1120 in the image forming apparatus 10. In step S4000, the program is activated when a user logs in by performing individual authentication from the authentication unit 150.

In step S4001, the CPU 1100 determines whether the user can log in based on authentication information transmitted to the authentication check unit 1600. When the CPU 1100 determines that the authentication information matches the authentication data (YES in step S4001), in step S4002, the CPU 1100 controls the image forming apparatus 10 to shift to the log-in state, turns on the power of the operation unit 140, and controls the touch panel 141 to be displayed.

In step S4003, the CPU 1100 determines whether the job data which is instructed for secure printing by the host computer 20 or 30 is stored in the HDD 1130. The determination is necessary to check if the secure printing is executable or not according to authentication management information based on the authentication information and the secure information used for the log-in.

When the secure print is executable (YES in step S4003), in step S4004, the CPU 1100 instructs printing using the secure printing function.

In step S4005, the CPU 1100 determines the state of the authentication method. More specifically, the CPU 1100 determines whether the ID card has been held for a predetermined time period or more over the authentication unit 150. The time period is determined as time between when the authentication unit 150 receives private information from the ID card and the timer 1620 starts to measure the time and when the authentication unit 150 cannot receive private information from the ID card and the timer 1620 stops to measure the time. In response to the end of the measuring, the authentication unit 150 notifies the CPU 1100 of elapsed time.

In step S4006, when the CPU 1100 determines that the ID card has been held shorter than the predetermined time period (NO in step S4005), the log-off-time control unit 1610 changes the value of the log off timer to the value at the time of execution of the secure printing. In step S4007, the CPU 1100 determines whether the operation unit 140 is operated by the user.

When the CPU 1100 determines that the operation unit 140 is operated (YES in step S4007), then in step S4008, the log-off-time control unit 1610 resets the value of the log off timer to the default value. In step S4009, the CPU 1100 determines whether the value of the log off timer in the log-off-time control unit 1610 is reset to zero.

When the ID card has been held for the predetermined time period or more (YES in step S4005), when the value of the log off timer at the time of execution of the secure printing becomes zero, or when the default value of the log off timer becomes zero, then in step S4010, the CPU 1100 activates the automatic log-off control program stored in the ROM 1120, and shifts the image forming apparatus 10 from the log-in state to the log-off state.

In response to the shift to the log-off state, the CPU 1100 controls the touch panel 141 not to be displayed.

As described above, according to the present exemplary embodiment, the time for log-off can be changed according to the state of the authentication method which enhances the convenience of the apparatus. If the log off processing may be started when time for authentication is short, the use of the state of the authentication method leads to power saving of the apparatus.

In the above description, when the ID card is held over the authentication unit shorter than the predetermined time period, the value of the log off timer is changed to the value at the time of execution of the secure printing. The value, however, may be changed when the ID card held over the authentication unit longer than the predetermined time period. In that case, the log off processing will start when the ID card has been held over for long period of time.

Further, the value of the log off timer may be reset to the default value from the value at the time of execution of the secure printing when a number of authentication using an ID card exceeds a threshold value (for example, two times). In addition to the above described state of the authentication method using the ID card, the above processing may be applicable to other authentication methods such as vein authentication and face authentication.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-174514 filed Jul. 27, 2009, which is hereby incorporated by reference herein in its entirety.

What is claimed is:

1. An image forming apparatus, comprising:
    an acquisition unit configured to acquire information for identifying a user;
    a log-in unit configured to allow the user to log in the image forming apparatus when the acquisition unit acquires the information for identifying the user;
    a log-off unit configured to cause the user who has been logged in by the log-in unit to log off from the image forming apparatus after a first predetermined time period elapses;
    a determination unit configured to determine whether a secure printing job to be performed based on the information for identifying the user acquired by the acquisition unit is present in the image forming apparatus; and
    a control unit configured to control the log-off unit to cause the user to log off from the image forming apparatus within a second predetermined time period which is shorter than the first predetermined period time, when the determination unit determines that the secure printing job is present in the image forming apparatus.

2. The image forming apparatus according to claim 1, further comprising a comparison unit configured to compare information for identifying a user to shift to a log-in state with secure information added to a printing job,
    wherein the log-off unit is configured to control the image forming apparatus to shift to a log-off state when the comparison unit determines that the information for identifying the user matches the secure information.

3. The image forming apparatus according to claim 2, further comprising a determining unit configured to determine whether an operation instruction is issued,
    wherein the log-off unit does not perform control when the determining unit determines that the operation instruction is issued.

4. The image forming apparatus according to claim 3, further comprising a measurement unit configured to measure elapsed time after completion of job processing of the printing job to which the secure information is added,
    wherein the log-off unit performs the control when the elapsed time measured by the measurement unit exceeds time that log off processing is desirably started corresponding to the completion of job processing.

5. The image forming apparatus according to claim 4, further comprising a confirmation unit configured to confirm an estimated time for completing the job processing of the printing job to which the secure information is added,
    wherein the log-off unit performs the control when the time measured for shifting the image forming apparatus to the log-off state exceeds the estimated time confirmed by the confirmation unit.

6. The image forming apparatus according to claim 5, wherein the log-off unit performs the control in a case where the estimated time confirmed by the confirmation unit is longer than the time that the image forming apparatus is desirably shifted to the log-off state and when the time measured for shifting the image forming apparatus to the log-off state exceeds the time that the image forming apparatus is desirably shifted to the log-off state.

7. The image forming apparatus according to claim 6, further comprising a discriminating unit configured to discriminate a state of an authentication method,
    wherein the log-off unit performs the control according to discrimination made by the discriminating unit.

8. The image forming apparatus according to claim 7, further comprising a display control unit configured to control a screen to be displayed in response to log-in performed by the log-in unit,
    wherein the display control unit sets the screen to a non-display state when the determination unit determines that the information for identifying the user matches the secure information.

9. The image forming apparatus according to claim 8, wherein the acquisition unit acquires information for identifying a user which is included in an ID card, and
    wherein, when a user of the image forming apparatus holds the ID card over the image forming apparatus for a time period longer than a specified value, the control unit performs control to cause the user to log off from the image forming apparatus at not the second predetermined time period, but the first predetermined time period.

10. A method for controlling an image forming apparatus, the method comprising:
    acquiring information for identifying a user;
    allowing the user to log in the image forming apparatus when the information for identifying the user is acquired;
    causing the logged-in user to log off from the image forming apparatus after a first predetermined time period elapses;
    determining whether a secure printing job to be performed based on the acquired information for identifying the user is present in the image forming apparatus; and
    controlling log-off processing to cause the user to log off from the image forming apparatus within a second predetermined time period which is shorter than the first predetermined period time, when it is determined that the secure printing job is present in the image forming apparatus.

11. A storage medium storing a program causing an image forming apparatus to execute a method for controlling the image forming apparatus according to claim 10.

* * * * *